Patented Aug. 23, 1932

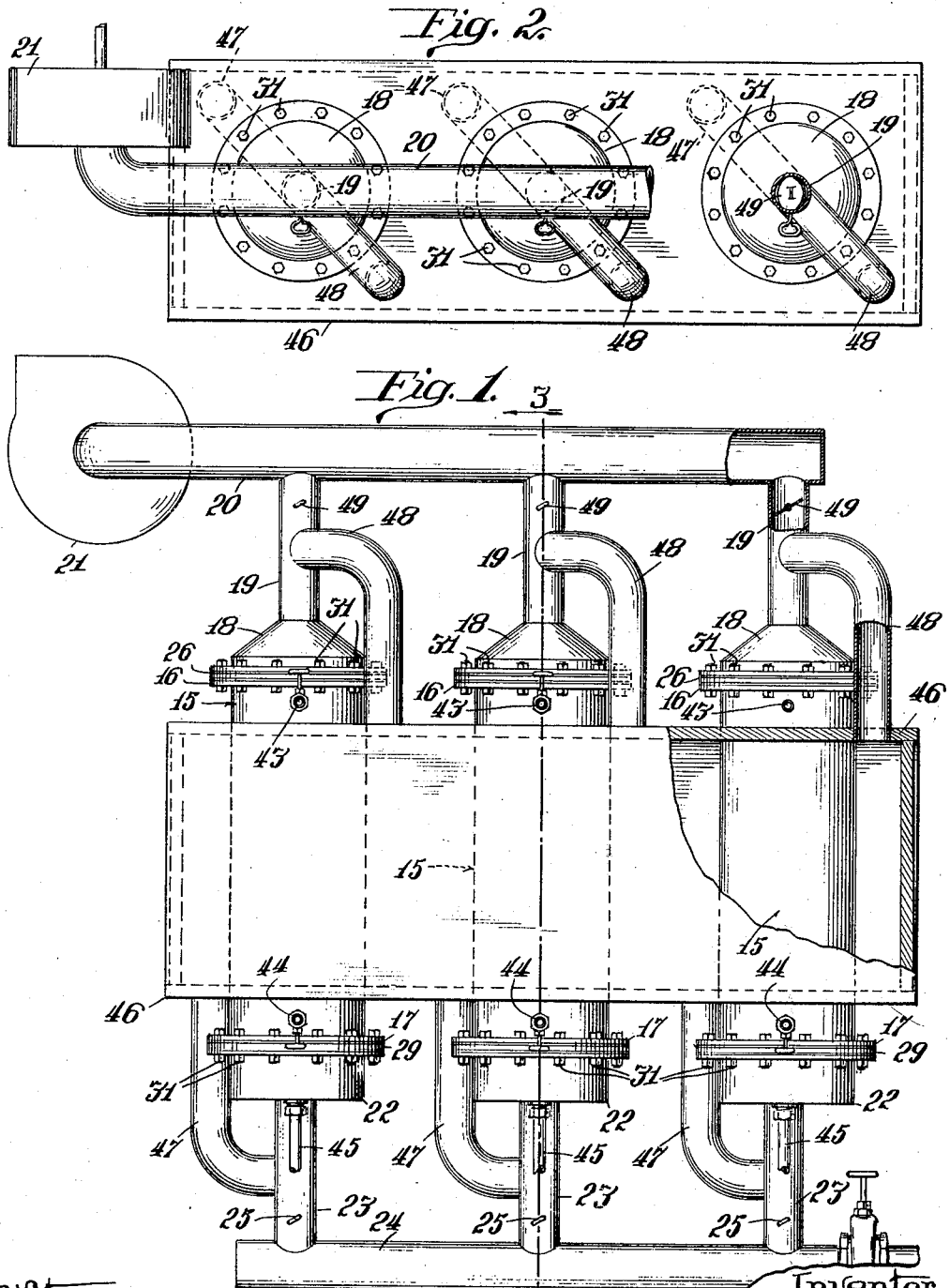

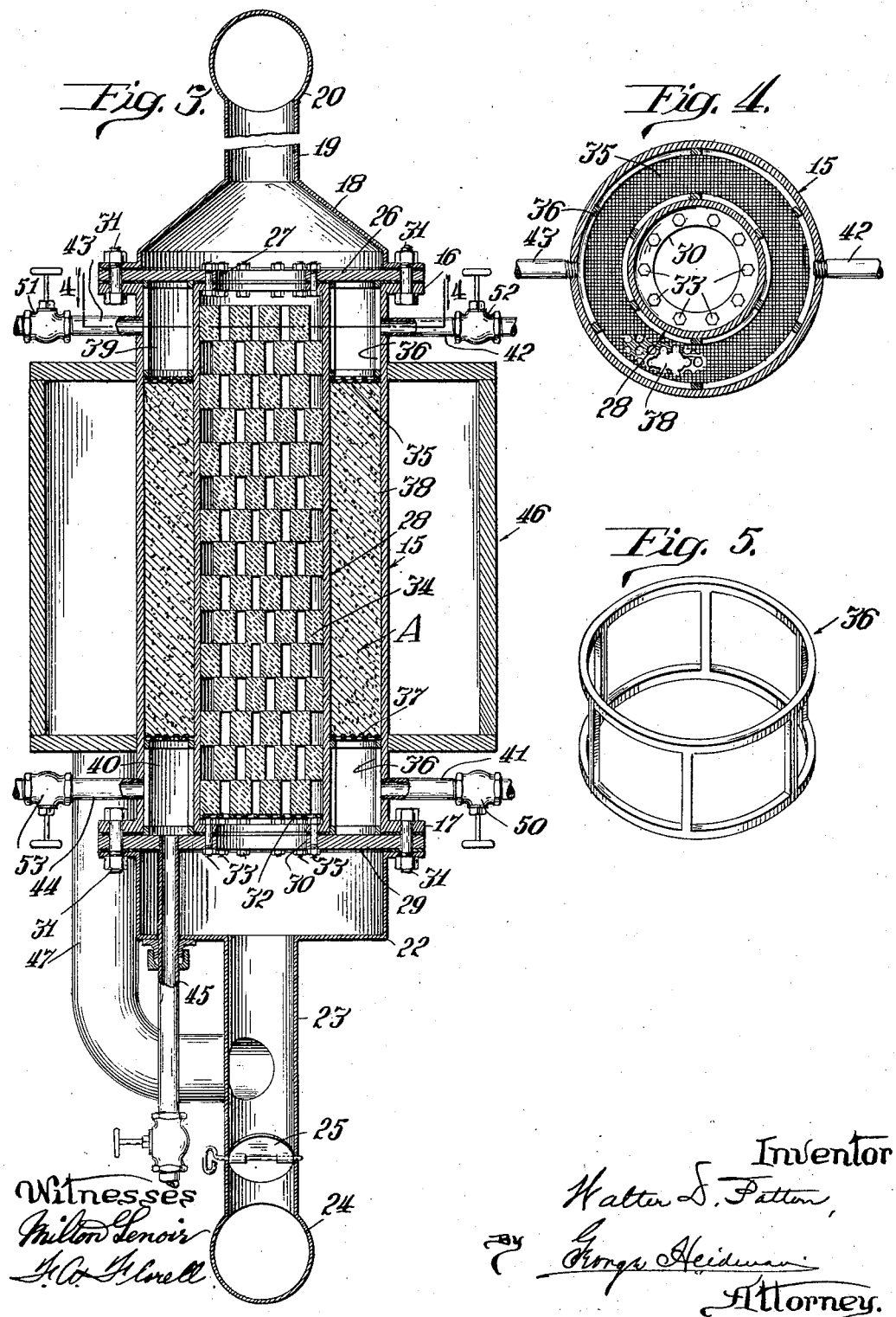

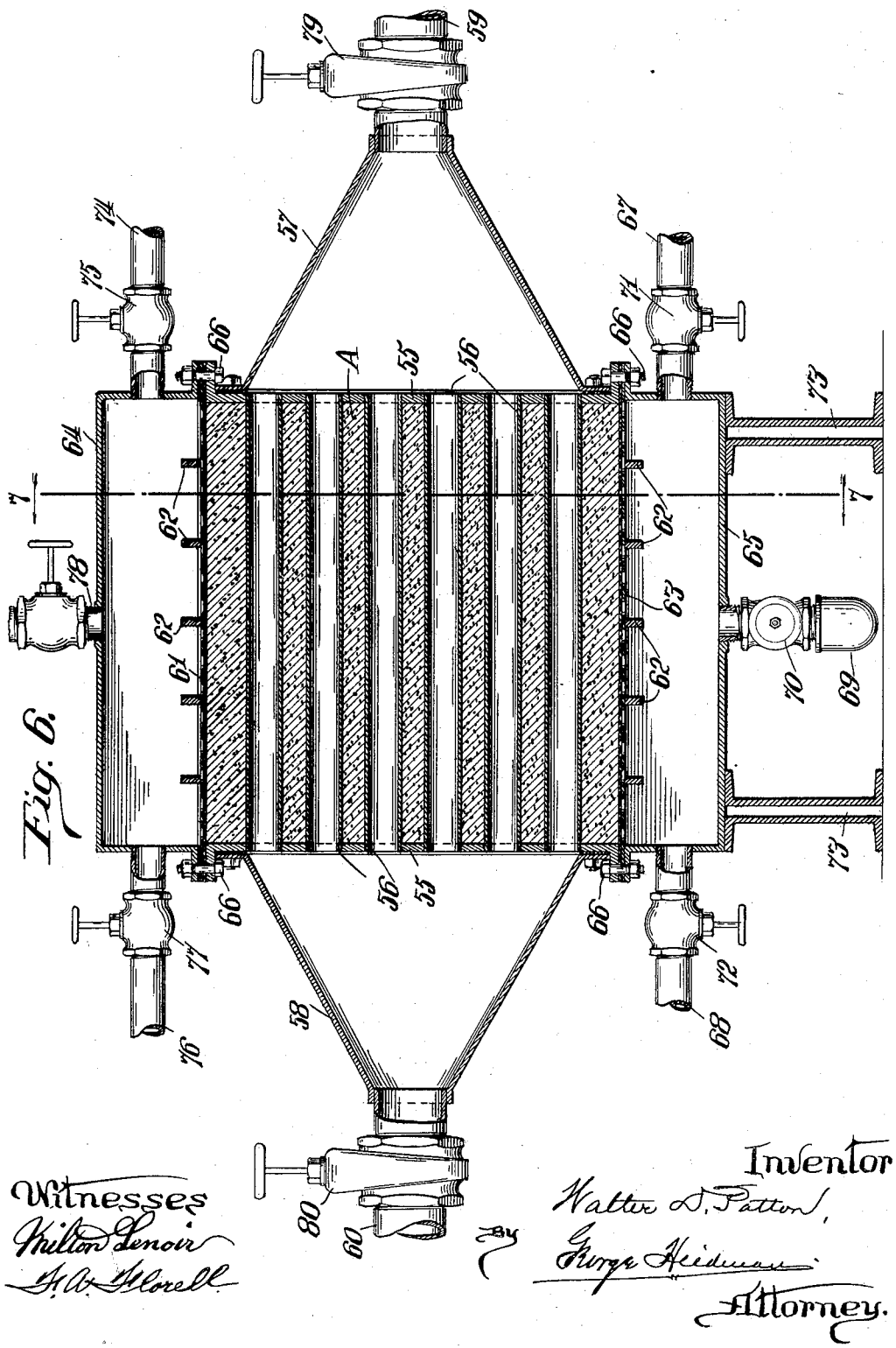

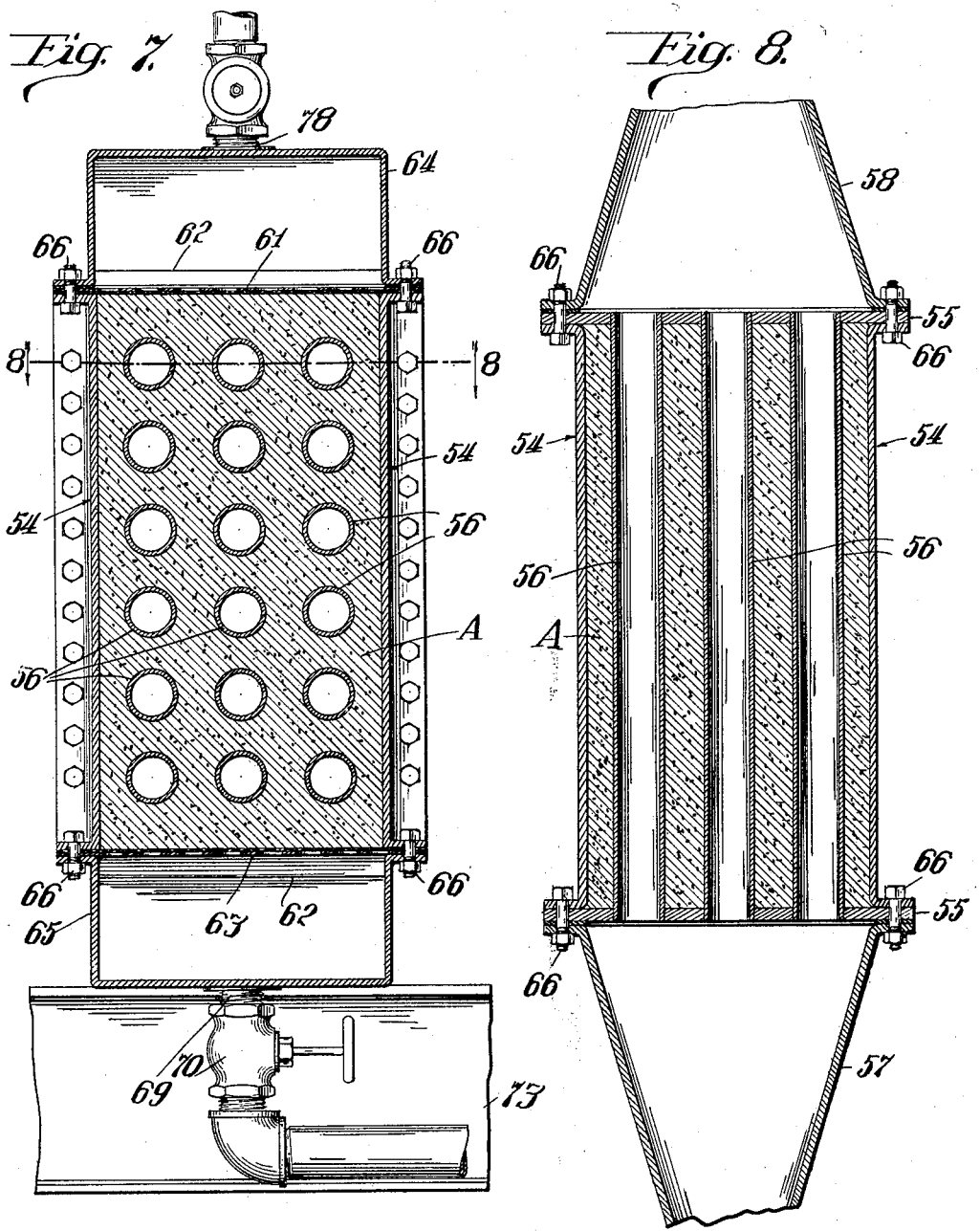

1,873,629

UNITED STATES PATENT OFFICE

WALTER D. PATTON, OF WAUKEGAN, ILLINOIS, ASSIGNOR TO NORTH SHORE COKE & CHEMICAL COMPANY, OF WAUKEGAN, ILLINOIS, A CORPORATION OF DELAWARE

APPARATUS FOR TREATMENT OF AMMONIA STILL WASTE

Application filed February 17, 1930. Serial No. 428,887.

My invention relates to apparatus especially intended for the separation of certain compounds, known as phenols, from the ammonia liquor or ammonia still waste obtained in the manufacture of gas or coke. That is to say, my invention relates to apparatus designed for the treatment of the ammonia liquor and particularly the ammonia still waste, containing the phenols, in order that the phenols may be separated from this liquor and ultimately recovered and subsequent proper disposition of the treated liquor be made without danger of contaminating near-by water supplies.

The objects and advantages of the invention will all be readily comprehended from the following description of the drawings, wherein:—

Figure 1 illustrates, in elevation, a series or battery of one form of my improved apparatus; with portions broken away and shown in section.

Figure 2 is a plan view thereof, with a portion of an outlet conduit broken away.

Figure 3 is a vertical sectional view of one of the units taken substantially on the line 3—3 of Figure 1 looking in the direction of the arrows.

Figure 4 is a detail sectional view taken substantially on the line 4—4 of Figure 3, as viewed by the arrows.

Figure 5 is a detail perspective view of a spacing element.

Figure 6 is a vertical sectional view of a modified form of my apparatus.

Figure 7 is a vertical sectional view taken substantially on the line 7—7 of Figure 6, as viewed by the arrows.

Figure 8 is a cross-sectional view taken substantially on the line 8—8 of Figure 7.

My improved apparatus, as stated, is especially devised for the separation and recovery of phenols from ammonia liquor or ammonia still waste generally obtained in the manufacture of gas or coke, and the apparatus, as exemplified in the first figures, involves one or more units composed of a suitable shell 15 of size sufficient to permit treatment of a suitable quantity of the liquor or ammonia still waste.

The upper and lower ends of the shell (which is preferably cylindrical) is provided with flanges 16 and 17; the upper end being adapted to receive a suitable hood 18, preferably of the more or less conical form shown and terminating at top in the outlet 19 which communicates with a conduit 20 to which similar outlets 19 of other similar units may be connected, as shown in Figure 1, for the purpose of taking off the gases employed in the operation of my apparatus. The conduit 20, at one end, is preferably shown provided with a suitable blower, as at 21, for inducing outflow through the conduit at a predetermined period in the operation of the apparatus and to induce an upward flow of hot gases through the apparatus.

The bottom of the cylinder 15 is shown provided with an annular bottom header 22 and is provided with an ingoing conduit 23 which communicates with a duct 24 adapted to receive hot gases of oven waste heat; the inflow being controlled by a suitable damper, as at 25, and this hot gas induced to flow upward through the apparatus by the exhaust blower 21 previously referred to.

The upper flanged end of the outer cylinder 15 is provided with an annular plate 26, the perimeter whereof is disposed between the upper flanges 16 of the outer shell and the flanges of the hood 18; the plate being provided with a central opening 27 therethrough.

The annular plate 26, adjacent to the central opening 27, has the upper flanged end of an inner shell 28 which is of smaller diameter than outer shell 15 and is of substantially the same length, with the bottom end thereof supported on and secured to annular plate 29 whose perimeter is secured between the bottom flange 17 and the bottom header 22. The plate 29, like plate 26, is also provided with a central opening 30 therethrough; and the annular plate 26; hood 18 and the bottom plate 29 and header 22 are secured to the ends of the outer shell 15 by suitable bolts, as shown at 31. The inner shell 28 is shown provided with a coarse grid or heavy screen at 32 shown supported by the heads of the bolts 33 which secure the lower flanged end of the inner shell 28 to the supporting plate 29. The grid or screen 32 provides support for the "checker work" or refractory baffle 34 which is preferably arranged throughout inner cylinder 28 in order to provide an indirect passage for the hot gases and for the purpose of absorbing the heat from said gases and thereby convey the same to the inner shell 28.

The upper end of the apparatus at a distance removed from the upper plate 26 and intermediate of the outer and inner shells 15 and 28 is provided with a similar screen of suitable metal (such as Monel or nichrome) and mesh as shown at 35 held in position by a suitable spacing element 36 which may be in the nature of a skeleton band, as more clearly shown in Figure 5.

The bottom of the apparatus, intermediate of the outer shell 15 and inner shell 28, at a distance above the lower plate 29, is also provided with a similar screen 37 of similar material and mesh and supported in place by a similar spacing element or member 36. It is understood, of course, that the screens 35 and 37 encircle the inner shell 28 and are therefore disposed at opposite ends of the cylindrical encircling chamber 38 disposed between the two shells 15 and 28; the perforated partitions or screens 35 and 37 maintain the carbon mass in place and at the same time permit the flow of ammonia liquor and vapor therethrough; these partitions thus providing an outlet chamber 39 at the upper end and with an ingoing chamber 40 at the lower end of the apparatus. The ingoing lower chamber 40 at one side is shown provided with a valved conduit 41 which is intended for introduction of the ammonia liquor or ammonia still waste leading from the gas or coke producing plant; while the upper chamber 39 is shown provided with a valved outlet 42 and with another outlet 43 at opposite sides; the outlet conduit 42 being intended to convey the freed phenols, while in vapor form, from the apparatus and to convey same to a suitable point of storage; while the outlet conduit 43 is preferably intended for the discharge of waste liquor after a freeing of the phenols has been accomplished by absorption.

The lower header 22 is also shown provided with a valve controlled conduit 44, which connects with a suitable source of hot gas supply; for example, being adapted to receive the hot oven gases obtainable during the manufacture of gas or coke.

The bottom of the annular chamber 38, intermediate of the outer and inner shells 15 and 28, is also shown provided with a valve controlled drain 45.

The outer shell or casing 15, intermediate of its ends, is shown surrounded by a housing 46 of suitable material, formed to provide a chamber about the shell 15 as shown. Where a series or battery of units are employed, this housing 46 may be made to surround all of said units, as shown in Figures 1 and 2; the housing 46 being arranged in close gas-tight relation with the respective outer shells 15.

The bottom of the housing is provided with a suitable conduit 47 which connects with the hot gas conduit 23. Where a number of units are employed, I prefer to provide a conduit 47 leading from each of the hot gas inlet conduits 23 of the respective units; all of said inlets 23 in such case being connected to the manifold or main duct 24, as shown in Figure 1.

The upper end of the outer housing 46 (preferably for each unit) is shown provided with an outlet conduit 48 (see Figure 1) which connects with the outlet conduit 19 of each unit.

Where a series of units are employed and arranged, as shown in Figure 1, I prefer to provide the ingoing conduit 23 of each unit with the closure member or valve 25.

Each conduit 19, in advance of its connection with the manifold or conduit 20, is also preferably provided with a closure member or valve 49, as shown in Figure 1; thus permitting the operating periods of the respective units to be separately controlled.

The annular chamber 38 of each unit, intermediate of the screens 35 and 37 at top and bottom, is intended to be provided with some suitable porous or absorbent carbon; as for example carbonized cocoanut shell preferably in granular form; namely a carbon capable of excessive absorption, as indicated at A.

The ammonia liquor, resulting from the production of gas or coke, is generally conveyed to a still where the ammonia is freed from the liquor. The remaining liquor contains the phenols which my improved apparatus is designed to remove and recover; and I have discovered that these phenols can be absorbed successfully by an activated carbon and then recovered from the saturated carbon by a rectification process, permitting the carbon mass to be again employed for another cycle of phenol absorption.

In the use of my apparatus, the ammonia still waste is first preferably conveyed to a suitable tank and treated with a carbon dioxide gas, or a gas rich in carbon dioxide, or waste oven gas may be used. Practically the same effect may, however, be obtained by treating the liquor with a suitable dilute mineral acid, such as hydrochloric acid, or with certain organic acids, such as acetic acid.

This treatment changes the liquor or still waste from an alkaline reaction to a slightly acid reaction, which will increase the absorbing action of the activated carbon in the annular chamber 38. This treatment of the liquor in advance of its introduction into my apparatus is preferably employed because it results in the removal of the gummy matter which is precipitated by the treatment mentioned, preventing the carbon mass from receiving a gummy and somewhat impenetrable coating and enabling a proper carrying out of the operation for which my apparatus is designed.

The clear liquor or still waste containing the phenols is then allowed to flow through inlet conduit 41, when the valve 50 is opened; causing the liquor to percolate through the carbon mass with which the annular chamber 38 is provided.

The liquid is allowed to flow through the activated carbon chamber at a definite rate of speed, depending upon the phenol content in the ammonia liquor; the flow through the carbon chamber being caused by opening valve 51 in the outlet conduit 43 at the upper end of the apparatus.

The liquor is permitted to flow into the chamber 38 until the carbon becomes saturated, which may be determined by a proper testing of the effluent liquor coming through outlet 43. As soon as the test indicates that the point of phenol saturation of the carbon has been reached, further inflow of liquor is then discontinued by closing valve 50.

The excess liquor is then drained from chamber 38 by opening the valve of the drain pipe 45; either valve 51 or valve 52 being left open to enable the draining to be performed. As soon as all of the excess liquor has been drained from the chamber the valve of drain pipe 45 and valve 51 of conduit 43 are then closed. In the further operation of the apparatus for the recovery of the phenols absorbed by the carbon mass in chamber 38, hot gas is then permitted to enter through conduit 23 into the header 22, passing through grid 32 and upward through inner shell 28; the gases being allowed to pass out through the top conduit 19 and conduit 20; such flow being induced by the action of blower or fan 21, if necessary. In order that this hot gas will not pass through shell 28 too rapidly without transferring the heat to the shell 28, I show the shell provided with the refractory material 34.

By this means the phenol saturated carbon in the annular chamber 38 will be heated. In order to ensure a thorough or uniform heating of chamber 38 and its contents, a portion of the hot gas in conduit 23 is conveyed by means of conduit 47 into housing 46 surrounding outer shell 15.

The hot gas is allowed to pass through the inner shell 28 and through the housing 46 until the saturated carbon mass is properly heated so as to vaporize the absorbed phenols; it being understood that before the heating operation is begun valve 52 in conduit 42 must be open in order that the distillate or phenol vapors may be discharged from chamber 38 and be conveyed to a suitable condenser by conduit 42.

In order to aid distillation and to "sweep out" the heavy gases which may be left in the carbons, in other words to "sweep out" the residual phenols and entrain the heavy phenols in vapor phase, hot gas may then be permitted to flow into the bottom header 22 by means of pipe 44 upon opening valve 53.

The hot gas passes upward through the screen 37 and through the heated carbon mass and allowed to pass out through conduit 42 to a suitable condenser; it being understood that the hot gas is introduced into chamber 38 after the saturated carbon mass has been indirectly heated as previously described. It will be understood, of course, that some suitable foundation for the units must be provided to support the apparatus.

In Figures 6 to 8, I illustrate a modified form of my apparatus involving what may be termed a horizontal type instead of the vertical type heretofore described. The apparatus as shown in Figures 6 to 8 comprises a rectangular type of shell 54, the ends whereof are provided with tube-sheets 55, in which the ends of a series of tubes 56 are secured. The opposite ends of the shell 54 are provided with the tapered hoods 57, 58; the hood 57 communicating with a valve controlled hot gas conduit 59, while hood 58 is provided with a valve controlled gas outlet conduit or flue 60. The shell 54 is preferably shown rectangular and the top wall 61 composed of foraminated metal, preferably Monel mesh, reenforced by suitable metal bars 62.

The bottom of the shell 54 is also provided with a similar foraminated wall 63 which is shown reenforced by the metal bars 62.

The top and bottom walls 61 and 63 are properly secured in place; being shown held between the flanges of shell 54 and the flanges of a top header 64 and a bottom header 65.

The headers are shown secured to the shell by the bolts 66, and suitable asbestos gaskets preferably being employed in these joints to provide tight or properly sealed connections. The bottom header 65 is shown provided with a valve controlled inlet 67 whereby the phenol containing ammonia liquor to be treated is introduced into the apparatus. The botom header 65 is also shown provided with a hot gas introducing conduit 68 and a drain outlet 69 provided with a suitable valve 70; the liquid inlet conduit having a suitable valve 71; while the gas conduit has a valve as at 72.

The apparatus is, of course, to be supported on some suitable foundation or support as for example the supporting pedestals 73.

The top header 64 is provided with an outlet conduit 74, having a suitable valve 75, whereby the freed phenols or phenol vapors are conveyed to some suitable condenser. The header 64 also has an outlet conduit 76, having a valve 77.

The header 64 is also shown provided with an auxiliary valve controlled conduit 78 which may be employed under certain conditions as an additional distillate outlet.

The shell 54 throughout and about the tubes 56 is provided with a suitable activated carbon mass, preferably in granular form, as indicated at A.

The carbon mass is maintained in place by the foraminated walls 61 and 63, while permitting the liquor to pass therethrough.

In operation it will be understood that initially the various valves of the respective conduits are all closed, except valve 77 in outlet conduit 76, and the liquid is introduced by opening valve 71 of conduit 67. The liquid flows upward from header 65 through the screen or foraminated wall 63, percolating through the carbon mass and around the various tubes 56. With valve 77 of conduit 76 open it can be determined whether the apparatus has been charged and the nature of the discharging liquor can be tested to determine whether the carbon mass has reached the point of saturation; it being understood that the liquor is allowed to flow continuously through the apparatus before the heating period and until the saturation period of the carbon has been reached. The introduction of liquid through conduit 67 is then discontinued.

Valve 70 of drain conduit 69 is then opened to drain the excess liquor from the carbon holding chamber; either valve 77 of outlet 76 or valve 75 of conduit 74 being opened to admit air so as to allow a full draining of the excess liquor.

After the excess liquor has been drained from the carbon chamber, the valve 70 of drain 69 is closed; and if valve 77 of outlet 76 was opened for the draining operation, this valve 77 is also closed and valve 75 of conduit 74 is then opened.

The valve 79 of conduit 59 is then opened to permit hot gas, such as waste oven gas, to flow into hood 57 and thence to flow through all of the tubes 56 and into discharge hood 58 and out through conduit 60 when the valve 80 has been opened; the outflow of the gas being controlled by the valve 80, thus ensuring a sufficient transference of heat from the hot gas to all of the tubes 56, thereby heating the saturated carbon mass in the shell 54. After a proper heating, the vaporized phenol will flow through the conduit 74 and thereby conveyed to a suitable condenser or condensers.

In order to carry or "sweep out" the heavier phenol vapors, valve 72 of conduit 68 may then be opened, allowing hot gas (conduit 68 being adapted to convey the gas from some suitable source, such as waste coke oven gas) to pass into header 65 and to pass through screen or foraminated wall 63 and upward through the carbon mass, carrying the heavy vapors with it on out through conduit 74.

It has been found that the carbon may be used for a considerable number of operations before its renewal or replacement is necessary.

It will be understood that the outer walls of the apparatus, the hot gas portions outside of the shell, as well as the top outlet end or chamber of the apparatus, are all preferably insulated to conserve the heat and prevent condensation in the upper outlet chamber.

I have shown what I believe to be the best embodiments of my invention, which have been described in terms employed merely as terms of description and not as terms of limitation, as structural modifications are possible and may be made without, however, departing from the spirit of my invention.

What I claim is:

1. An apparatus of the character described comprising a casing provided with heating passages and with an absorbent material holding portion adjacent to said passages; a controllable liquor introducing inlet for said absorbent material holding portion; a controllable liquor outlet from said portion; a controllable vapor outlet from said portion; a controllable liquor drain outlet from said portion; and controllable means for introducing a heating medium into said passages.

2. An apparatus of the character described comprising a casing provided with heating passages and with an absorbent material holding portion adjacent to said passages; a closable liquor introducing inlet to said portion; a closable liquor outlet from said portion; a vapor outlet from said portion; a closable liquor drain in the bottom of said portion; controllable means for introducing a heating medium into said passages; and a controllable hot gas conveying conduit communicating with said absorbent material holding portion.

3. An apparatus of the character described comprising a casing provided with foraminated walls arranged in spaced relation with the opposite walls of the casing whereby chambers are provided at opposite ends of the casing and a chamber between the foraminated walls is provided, the chamber between the foraminated walls being filled with an absorbent material; means disposed through the absorbent material holding chamber for conveying hot gas in a plurality of paths through said chamber; hot gas receiving chambers at opposite ends of said means, the one being a hot gas receiving chamber and the other being a gas discharging chamber; a controllable ammonia liquor introducing conduit connected with one of said first mentioned chambers; a valved vapor outlet communicating with the other of said first mentioned chambers and a valved liquor outlet communicating with said chamber.

WALTER D. PATTON.